Sept. 28, 1943. H. HAUTSCH 2,330,580
PRESELECTING GEAR CHANGE
Filed April 3, 1940 3 Sheets-Sheet 2
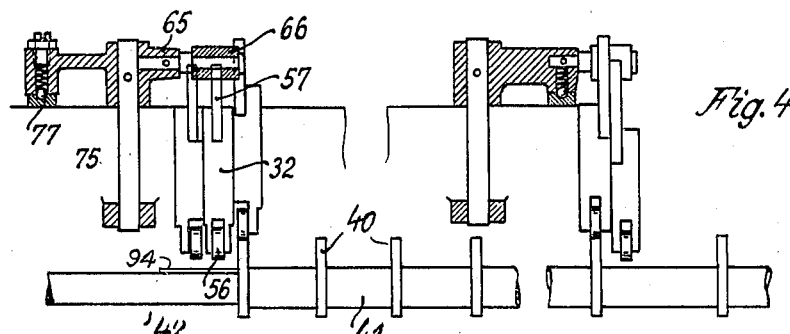
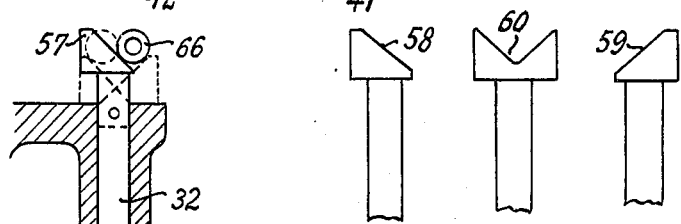
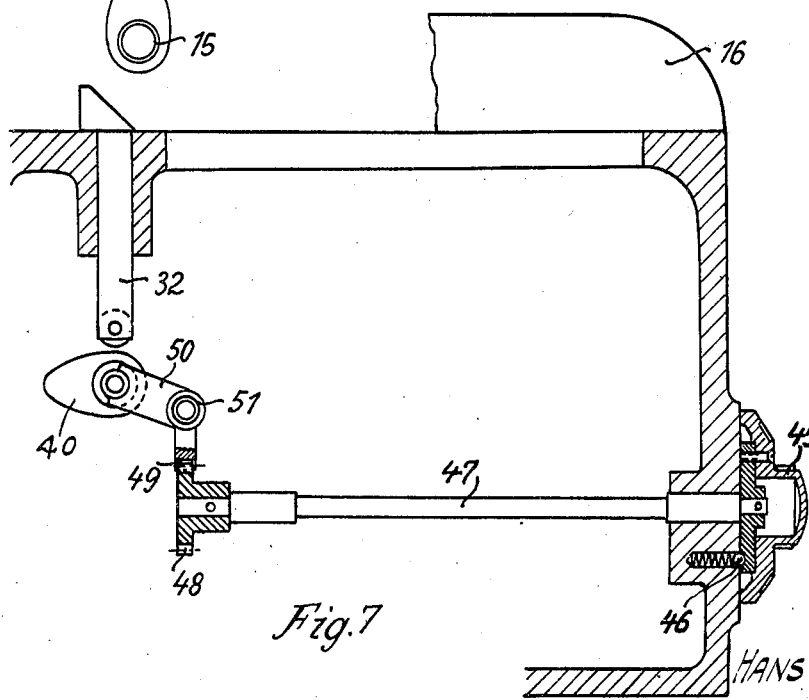
Inventor
HANS HAUTSCH,
By Beau, Brooks, Buckley & Beau.
Attorneys

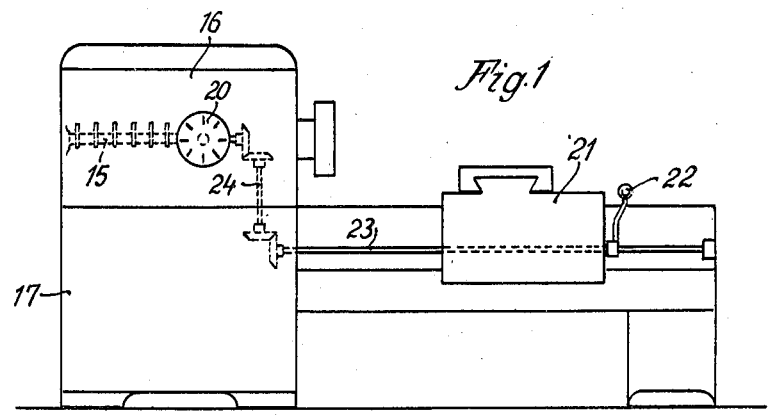
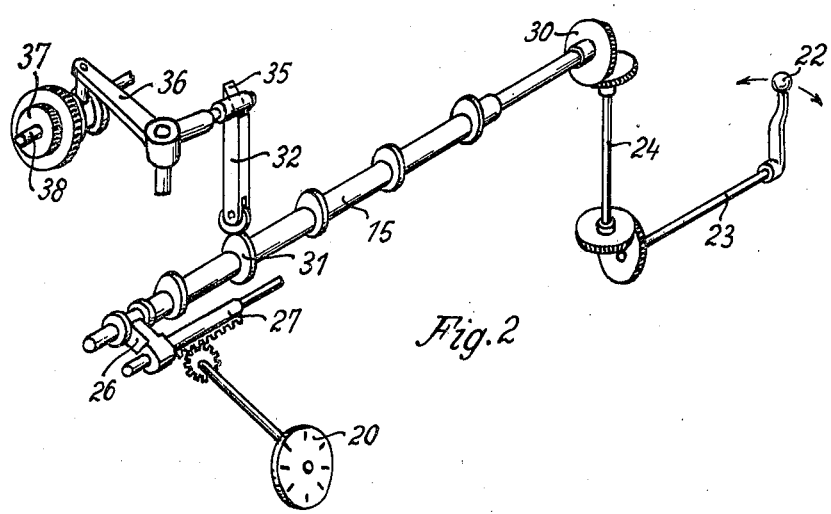
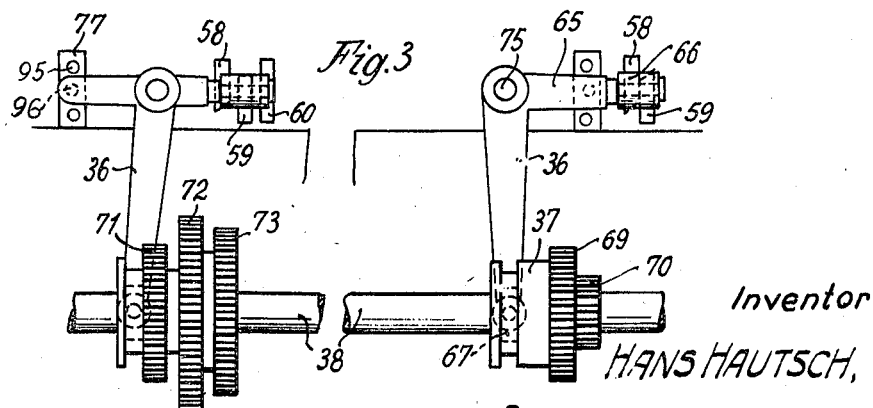

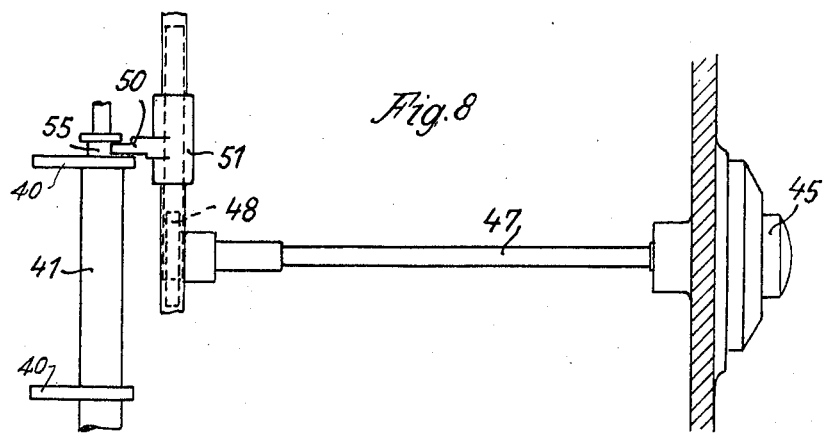
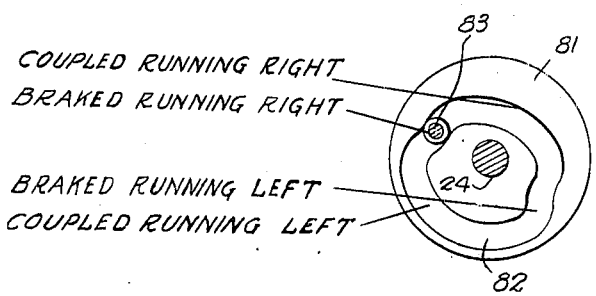
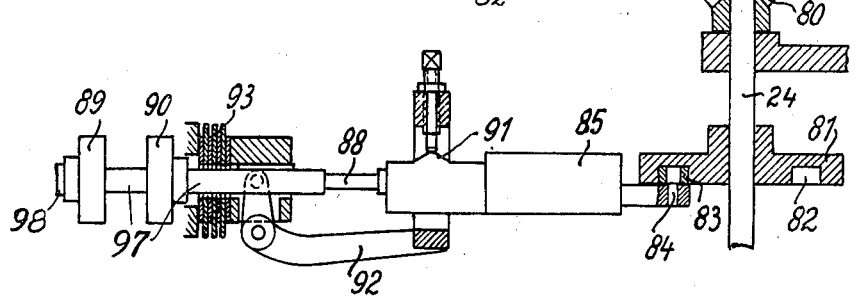

Patented Sept. 28, 1943

2,330,580

UNITED STATES PATENT OFFICE 2,330,580

PRESELECTING GEAR CHANGE

Hans Hautsch, Meuselwitz, Thur, Germany; vested in the Alien Property Custodian

Application April 3, 1940, Serial No. 327,675
In Germany April 29, 1939

12 Claims. (Cl. 192—4)

For gear changing on machine tools, particularly centre lathes and turret lathes, preselecting systems have been proposed that permit a change of gear to be selected during operation, besides the usual single and multiple lever control systems that are operated whilst the machine is stationary. These well known constructions which, as a rule, are either hydraulically or electrically operated are necessarily of a complicated nature and have the disadvantage that an operator cannot execute requisite changes from his working position, simultaneously keeping the workpiece under continuous observation, but must for example, go to the head stock and manipulate several levers or operating handles.

This present invention has for its object a new form of preselecting gear change for transmission and feed speeds, that is actuated exclusively mechanically; and which is characterized by simple construction, elimination of every faulty change, and convenient operation.

The invention, furthermore, resides in a construction of the said gear changing device which allows the operator to select another head stock speed during a running cut, and, at the required moment to bring it into action from his working position, e. g. from the lathe saddle and by means of the same lever that serves to start and stop the machine and to provide for right and left hand drive.

More in detail, the inventive preselecting gear change is characterized by three elements, firstly by a slidable and rotatable camshaft located in the machine head stock, for example, its separate cams adjoining corresponding feed rods that operate the movable change wheels; secondly by a mechanical preselector which when displacing the camshaft disconnected with the feed rods, effects the association of certain cams with certain feed rods, and thirdly by a control mechanism which enables a swivelling of the camshaft and, thus, a cooperation of the selected cam with its adjoining feed rod.

If for example to slide the camshaft, a selector disc is chosen which through a controlling spindle and a pinion drive, a worm or the like actuates the camshaft, and if the latter is swivelled by means of a controlling lever, fitted to the saddle and connected to the camshaft by means of intermediate shafts, the operator has to manipulate only two devices that are situated distinctly and can under no circumstances be handled incorrectly; consequently any selected speed change may be executed in the simplest manner without a noticeable interruption of the machining process.

To permit a more detailed explanation of the invention a practical example is shown in the accompanying drawings.

Fig. 1 is a schematic view of a lathe fitted with the arrangement according to the invention.

Fig. 2 is a schematic diagram from which the functioning of the most important parts of the preselector system may be seen.

Fig. 3 is a plan view, and

Fig. 4 is a side elevation showing the camshaft with its acompanying parts.

Fig. 5 shows a side elevation of the camshaft and a push rod.

Fig. 6 shows one type of push rod end.

Fig. 7 is a side elevation, and

Fig. 8 a plan of the connection between selector disc and camshaft.

Fig. 9 shows a section through an auxiliary arrangement.

Fig. 10 is a face view of a coupling and brake operating cam; and

Figs. 11 and 12 are similar to Fig. 6 and illustrate other types of push rod ends.

In Fig. 1 camshaft 15 is shown located in head stock 16 of lathe 17, and is provided to set, in accordance with this invention, different gear ratios. It can be slid to and fro by selector disc 20, and rotated by operating lever 22 fitted to lathe saddle 21 through intermediate shafts 23 and 24.

To enable these operations to be more clearly understood Fig. 2 shows a diagram of operation. On the left hand end of camshaft 15 a fork 26 in conjunction with toothed rack 27 is actuated by means of selector disc 20, so that it and also the camshaft can be slid to left and right; this is shown in detail in Figs. 7 and 8. On the right hand end of camshaft 15, a bevel wheel 30 is fitted, which is turned by lever 22 through shafts 24 and 23.

Adjoining the cams on shaft 15, push rods are arranged as will be explained in the following. If for example, through turning selector disc 20 cam 31 is brought under push rod 32, and is swivelled by lever 22 as shown in Fig. 2, push rod 32 lifts and with its bevelled face throws the angle lever 36 (or a shifter fork or similar element). The latter in turn acts on sliding gear assembly 37, and its swivel motion shifts said assembly on shaft 38.

In this way it is possible to operate several sliding gear assemblies through a system of swivel levers, push rods and cams, in order that the desired ratio of transmission may be obtained. At the same time it will be seen from Fig. 2, that if for example the cams on shaft 15 are turned 90° counterclockwise and do not come into contact with push rods 32, a definite cam can be adjoined to a definite push rod, and, thus, a determined ratio can be prepared without difficulty whilst the other assembly remains still in gear. It will be understood that when the new assembly is shifted into engagement by rotation of the cam shaft, the existing assembly will simultaneously be disengaged, the preparation of the new assembly causing one of the cams to be positioned beneath a push rod 32 which is adapted to disengage the existing assembly upon rotation of the cam.

From the constructive example according to Figs. 3 and 4, it will be noted that the camshaft is made up of a sleeve 41 carrying cams 40 and sliding on shaft 42, on which it may be shifted by means of slot and feather key 94 without revolving relative to the shaft.

Now in order to shift sleeve 41 thereby bringing a certain cam 40 under a definite push rod, a selector disc 45 adjustable to the separate stages and held by means of ball-bearing stops 46 is fitted to head stock 16 on shaft 47, as shown in Figs. 7 and 8. The opposite end of this shaft is fitted with pinion 48 meshing with toothed rack 49 of sleeve 51 carrying operating fork 50. Fig. 8 shows how operating lever 50 engages in a corresponding fork slot or groove 55 on sleeve 41.

If the selector disc 45 be turned a distance regulated by figures or marks, sleeve 51 is shifted accordingly, and with it sleeve 41 is moved axially.

The shifting of sleeve 41, and the arranging of cams, is chosen so that by each adjusting stage of selector disc 45 a definite cam 40 is brought under a push rod, the latter being described in the following.

From Figs. 4 and 5 it will be seen, that push rod 32 consists of a ram, its lower end having roller 56 set in, its upper end being fitted with a bevelled face 57, which as shown in Fig. 6, may be a right hand bevel 59, or as shown in Fig. 11 a left hand bevel 58, or as shown in Fig. 12 a taper slot 60, depending upon the direction in which force is to be effected. This force, as shown in Fig. 2 is exercised upon an angle lever 36, whose one arm 65 carries roller 66 (see also Figs. 4 and 5), whilst the other arm engages by means of slide block 67 or similar element, into a guide slot of its respective sliding gear assembly 37, two of which are shown in Fig. 3, namely one with two gear wheels 69 and 70, the other one with three wheels 71, 72, 73.

If angle lever 36 is swivelled about its pivot spindle 75, gear assembly 37 which slides by slot and feather key on shaft 38 must shift axially correspondingly with the swivelling; if for example the gear assembly 37 with wheels 69 and 70 is operated by a left hand push rod 58 and a right hand push rod 59, it is possible to mesh either gear 69 or 70 with its respective mating gear according to which push rod lifts, whilst in the left hand example of Fig. 3, three push rod ends 58, 59, 60, according to Fig. 6 operate on a triple gear assembly. Figs. 3 and 4 also show that angle lever 36 can be stopped in its separate positions by means of stops 77. The latter may have recesses for receiving a spring pressed ball 96 carried by the lever to releasably hold the gear assembly in any of its operating positions.

When as seen in Figs. 7 and 8 a certain cam 40 has been pushed under the desired push rod, an upward swivelling of the cam (into the position shown in Fig. 5) lifts the push rod as shown in Figs. 1 and 2 and brings about required ratio of transmission.

The method of selecting cams and push rods is to be seen from the plan of connection shown in Fig. 9, as a part of a 12-stage-assembly. Starting from the fundamental position on the left it follows that with a definite axial movement of the camshaft push rod 32a works together with cam 40a, whilst this same cam in the next stage works with push rod 32b, and in a further stage becomes non-operative; but push rod 32c contacts with cam 40b; and with every movement of the camshaft new cams and push rods engage with each other.

Manipulation of control lever 22, in addition to swivelling the cam shaft, may also be employed to effect additional functions which will be described with reference to Fig. 9. As there shown, a pair of couplings 89 and 90 are interposed between a drive shaft 98 and a driven shaft 97, for effecting right and left hand machine drive, the couplings being controlled by a connecting rod 88 which extends through shaft 97. When rod 88 is moved fully to the left, coupling 89 may be engaged and coupling 90 disengaged, causing the shaft 97 to be driven in one direction, and when rod 88 is moved fully to the right, coupling 89 may be disengaged and coupling 90 engaged, causing the shaft 97 to be driven in the opposite direction. When rod 88 is in an intermediate position, both couplings may be disengaged, and means are provided for braking the shaft at this time.

The braking means may comprise a cam 91 movable with rod 88 and operating a lever 92 to apply brake 93 whose movable elements are carried by shaft 97. Connected to rod 88 and cam 91 is shift rod 85 having projecting therefrom a pin 84 provided with a block or roller 83 slidable in curved cam slot 82 in a disc 81 which may be secured to the intermediate shaft 24.

In the position shown in Fig. 9, wherein brake 93 is applied, the couplings 89, 90 are disengaged or opened; turning shaft 24 in one direction will shift rods 85 and 88 to the left, engaging or closing clutch 89, while turning the shaft in the opposite direction will shift rods 85 and 88 to the right, engaging or closing clutch 90. The contour of the curved slot 82 is shown in Fig. 10, on which are indicated by broken lines the relative positions of the roller 83 in the slot in which the several control functions occur, it being understood that the brake 93 will be applied between the positions designated "Braked running left" and "Braked running right."

The cam disc 81, or other control device, is so related to the cam shaft 41 that when the lever 22 is moved from either normal operating position, i. e., either the position wherein coupling 89 is engaged or that in which coupling 90 is engaged, so that the machine is operating, the coupling is first disengaged, then brake 93 is applied, and finally the cam shaft is brought to its fully operated position as in Fig. 5. In this position the gear change wheels will have been moved to the selected position. Now upon movement of the lever 22 to either normal operating position the brake 93 will be released and then the coupling will be engaged.

As illustrating a typical operating sequence, we will start with a position wherein gear 72 of cluster 71, 72, 73 is in mesh and the gear 69 of gears 69, 70 is in mesh (see Fig. 3), and the drive is through coupling 89. Assuming that the drive is desired to be reversed, through coupling 90, and gear 73 is to be meshed instead of gear 72 with a gear (not shown), and gear 70 instead of gear 69 is to be meshed with a gear (not shown), and further assuming that such meshing of gears can be accomplished by sliding cluster 71, 72, 73 to the left and by sliding cluster 69, 70 to the right from the position shown, the operation will be as follows:

First the cam shaft will be shifted, by turning disc 20 to bring a cam 31 under the push rod having bevel 58 and simultaneously bring another cam 31 under the push rod having bevel 59 at the right end of Fig. 3. The handle 22 is now swung to the left. During this movement, as it approaches the position shown in Fig. 2, the coupling 89 will first be disengaged and brake 93 applied, stopping the drive. As the drive is stopped cams 31 will be swung to the upright position raising the above indicated push rods, swinging the left arm 36 to move cluster 71, 72, 73 to the left, thereby moving gear 72 out of mesh and moving gear 73 into meshing engagement; and simultaneously swinging to the right the arm 36 which shifts cluster 69, 70, moving the latter into a position wherein gear 70 is engaged. Continued movement of the handle 22 to the left of the position shown in Fig. 2 will now rotate the cams 31 out of the engagement with the push rods, so that they are free to be shifted axially for the next gear change operation; the brake 93 will be released, and the coupling 90 connected, producing the assumed desired condition.

If the gears are to be restored to the assumed starting position, the disc 20 is turned to bring cams of the cam shaft under the push rod having bevel 60 at the left of Fig. 3 and under the rod having bevel 58 at the right of the view. Now if the handle 22 is swung to the right, in Fig. 2, the drive will be disrupted, the gear clusters will be shifted to disengage gears 73 and 70 and to engage gears 72 and 69, and finally the drive through the coupling 89 and gears 72 and 69 will be consummated.

It will be understood that the structure herein specifically shown and described is merely illustrative of one embodiment of the invention, and that the invention may be otherwise embodied without departing from the spirit of the invention or the scope of the appended claims.

What I claim is:

1. In combination with a preselecting gear change for transmission and feed speeds on machine tools, in particular centre and turret lathes, a slidable and rotatable shaft device 41, 42 and a series of cams 40 borne by a portion thereof, feed members 32 adapted to actuate slidable gear change wheels 37, a mechanical selector 45 provided to associate definite cams to definite feed members by sliding the cam bearing portion of said shaft device independently of said feed members, and a control device 22 adapted to rotate the shaft device and thereby to operate a selected feed member by the respective cam.

2. In an arrangement as set forth in claim 1, said shaft device comprising a cam-carrying sleeve 41, and a shaft 42 slidably, but not rotatably supporting said sleeve.

3. In combination with a preselecting gear change as set forth in claim 1 a selector disc 45, means for adjustably holding said disc in separate positions, and a controlling rod 47 connected to the disc and mounting a gear 48, 49, said gear being arranged to engage the cam bearing portion of the shaft device for effecting a selective movement thereof.

4. In combination with a preselecting gear change as set forth in claim 1, a selector disc 45 arranged on the front of the machine head stock 16, ball stops 46 for adjustably holding said disc in separate positions, a controlling rod 47 connected to said disc and mounting a rack and pinion gear 48, 49, and a shifter fork 50 connecting said gear 48, 49 and the cam bearing portion of the shaft device for effecting a selective movement thereof.

5. In combination with a preselecting gear change as set forth in claim 1, a control lever 22 adapted to swivel the shaft device, and intermediate shafts 23, 24 interconnecting said lever and said shaft device 42.

6. In an arrangement as set forth in claim 1, said feed members consisting of push rods 32.

7. In combination with a preselecting gear change as set forth in claim 1, tiltable angle levers 36 inserted between said feed members 32 and said gear change wheels 37.

8. In an arrangement as set forth in claim 1, said feed members consisting of push rods 32, provided with right or left hand bevel or taper slotted heads 58, 59, 60 respectively adapted to effect right or left hand or neutral position of said gear change wheels 37.

9. In combination with a preselecting gear change as set forth in claim 1, tiltable angle levers 36 inserted between said feed members 32 and said change wheels 37, and stops 77 adapted to adjust the angle levers in their respective positions.

10. In combination with a preselecting gear change as set forth in claim 1, a control lever 22 adapted to swivel the shaft device, intermediate shafts 23, 24 interconnecting said lever and said shaft device 42, a double coupling 89, 90 for right and left hand transmission of the machine, a control mechanism 81 arranged on one of said intermediate shafts, and operating means inserted between the control mechanism and the double coupling.

11. In combination with a preselecting gear change as set forth in claim 1, a control lever 22 adapted to swivel the shaft device, intermediate shafts 23, 24 interconnecting said lever and said shaft device 42, a double coupling 89, 90 for right and left hand transmission of the machine, a cam disc 81 arranged on one of said intermediate shafts, a shift rod 85 operatively connecting said cam disc and said double coupling, a cam 91 provided on the shift rod, a transmission brake 92, 93 for said gear change, said cam 91 being adapted to apply said brake 92, 93 when said cam disc is rotated into a predetermined position.

12. In combination with a preselecting gear change as set forth in claim 1, a control lever 22 adapted to swivel the shaft device, intermediate shafts 23, 24 interconnecting said lever and said shaft device 42, a double coupling 89, 90 for right and left hand transmission of the machine, a cam disc 81 arranged on one of said intermediate shafts, a shift rod 85 operatively connecting said cam disc and said double coupling, a cam 91 provided on the shift rod, a transmission brake 92, 93 for said gear change, said cam 91 being adapted to apply said brake 92, 93 upon rotation of said cam disc, said cam being arranged in such a way that when the control lever 22 is moved in one direction to initially open a first transmission coupling, there follows an operation of means to apply the transmission brake 93, and connect a second transmission coupling in sequence, and when said lever 22 is moved in the opposite direction there follows an operation of means to open the second transmission coupling, apply the transmission brake and then couple the first transmission.

HANS HAUTSCH.